United States Patent
Carlhoff et al.

(10) Patent No.: US 10,401,851 B2
(45) Date of Patent: Sep. 3, 2019

(54) METHOD FOR SECURE TRANSFER OF AN UNACCOMPANIED PERSON BY AUTONOMOUS VEHICLE

(71) Applicant: FORD MOTOR COMPANY, Dearborn, MI (US)

(72) Inventors: Philipp Carlhoff, Herzogenrath (DE); Georg Neugebauer, Herzogenrath (DE); Stephan Strahl, Bayern (DE)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 15/865,473

(22) Filed: Jan. 9, 2018

(65) Prior Publication Data

US 2018/0196421 A1   Jul. 12, 2018

(30) Foreign Application Priority Data

Jan. 9, 2017   (DE) .................. 10 2017 200 151

(51) Int. Cl.
| | |
|---|---|
| *G05D 1/00* | (2006.01) |
| *B60R 25/25* | (2013.01) |
| *B60R 11/04* | (2006.01) |
| *G06K 9/00* | (2006.01) |
| *B60W 30/00* | (2006.01) |

(52) U.S. Cl.
CPC ............ *G05D 1/0022* (2013.01); *B60R 11/04* (2013.01); *B60R 25/252* (2013.01); *B60W 30/00* (2013.01); *G05D 1/0038* (2013.01); *G05D 1/0088* (2013.01); *G06K 9/00832* (2013.01); *B60R 2300/8006* (2013.01); *G05D 2201/0212* (2013.01); *G05D 2201/0213* (2013.01); *G06K 9/00362* (2013.01)

(58) Field of Classification Search
USPC .......................................... 701/25
See application file for complete search history.

(56) References Cited

U.S. PATENT DOCUMENTS

| | | | |
|---|---|---|---|
| 8,688,306 B1 | 4/2014 | Nemec et al. | |
| 9,436,182 B2 * | 9/2016 | Nemec ................. | G05D 1/0055 |
| 9,910,438 B1 * | 3/2018 | Arden ..................... | E05F 15/70 |
| 9,983,582 B2 * | 5/2018 | Nemec ................. | G05D 1/0055 |
| 2011/0112969 A1 | 5/2011 | Zaid et al. | |
| 2013/0088348 A1* | 4/2013 | Verachtert .............. | B60R 22/48 |
| | | | 340/457.1 |
| 2015/0006005 A1 | 1/2015 | Yu et al. | |
| 2015/0149023 A1 | 5/2015 | Attard et al. | |
| 2015/0233719 A1 | 8/2015 | Cudak et al. | |

(Continued)

*Primary Examiner* — Masud Ahmed
(74) *Attorney, Agent, or Firm* — Brooks Kushman P.C.

(57) ABSTRACT

A method of operating a self-driving (autonomous) motor vehicle to transport a passenger who requires supervision. An authorization of a sender to operate the vehicle is checked and, if authorized, the sender provides instructions to a vehicle control unit to designate a destination and one or more authorization criterion that must be met by a recipient in order to unlock the vehicle and take custody of the passenger at the destination. The vehicle travels to the destination autonomously, during which travel the status of the passenger is monitored and transmitted wirelessly to a device in the possession of the sender. At the destination, unlocking of the vehicle is permitted upon confirmation of the authorization criterion by the recipient.

17 Claims, 2 Drawing Sheets

(56) References Cited

U.S. PATENT DOCUMENTS

| | | |
|---|---|---|
| 2015/0248131 A1 | 9/2015 | Fairfield et al. |
| 2015/0294518 A1* | 10/2015 | Peplin .................... B60R 25/23 340/5.22 |
| 2015/0321595 A1 | 11/2015 | Hempsch et al. |
| 2015/0338849 A1* | 11/2015 | Nemec ................. G05D 1/0055 701/25 |
| 2016/0273922 A1 | 6/2016 | Stefan |

* cited by examiner

METHOD FOR SECURE TRANSFER OF AN UNACCOMPANIED PERSON BY AUTONOMOUS VEHICLE

CROSS-REFERENCE TO RELATED APPLICATIONS

This application claims foreign priority benefits under 35 U.S.C. § 119(a)-(d) to DE Application 10 2017 200 151.8 filed Jan. 9, 2017, which is hereby incorporated by reference in its entirety.

TECHNICAL FIELD

The present invention concerns an operating method for a motor vehicle that is designed for autonomous travel. With the operating method, a person needing supervision by a responsible party, for example an underage person, is transported in an autonomously-driven vehicle unaccompanied by the responsible party. In addition, the present invention concerns a motor vehicle for carrying out the operating method.

BACKGROUND

In the prior art, a motor vehicle is known from US 2015/0149023 A1 that is designed to drive autonomously. The motor vehicle comprises at least one autonomous driving sensor operative to monitor at least one state while operating in an autonomous mode. The motor vehicle is further operative to identify at least one occupant, to select a profile associated with the occupant and to operate at least one subsystem autonomously according to the selected profile and to monitor the at least one state by means of the at least one autonomous driving sensor.

The object of the present invention is to provide an operating method for a motor vehicle that is designed for autonomous driving, with which a person requiring supervision, in particular a child, can be transported and to provide a motor vehicle that is designed to carry out the operating method.

SUMMARY

The operating method disclosed herein is for a motor vehicle that is designed to drive autonomously for transporting a passenger to a specified destination. The motor vehicle comprises a self-driving unit for autonomous driving and further a human-machine interface and a control unit for controlling the operation of the motor vehicle. With the operating method, the authorization of a sender is checked in a first authorization check. If the sender is authorized, the instructions of the sender, comprising at least one destination and an indication of a recipient, are received in an instruction query. The passenger is transported to the destination in a journey. At the destination, the authorization of the recipient is checked in a second authorization check.

As a result, advantageously a method for a motor vehicle that is designed for autonomous driving is provided, the application of which constitutes a "secure transfer mode" or a "nanny mode," with which for example children can be transported to a destination without the presence in the vehicle of a supervisor/custodian.

In an advantageous embodiment of the method, locking of a door of the motor vehicle is carried out by means of a locking unit of the motor vehicle following the input or entry of instructions by the sender and before the journey. In addition, following the second authorization check, unlocking of the door is carried out if the second authorization check has resulted in the recipient meeting the authorization criteria.

In this way it can be ensured that no unsafe situation can be produced by the passenger during the journey as a result of opening the door. At the same time, the passenger is protected and secured against the door being opened by an unauthorized person.

In a further advantageous embodiment of the operating method according to the invention, monitoring of the passenger is carried out during the journey by means of a monitoring unit of the motor vehicle with which at least one state of the passenger is monitored.

As a result, the welfare of the passenger can be ensured.

In a further advantageous embodiment of the operating method according to the invention, the at least one state is sent to a remote unit by means of a communications unit of the motor vehicle.

As a result, the sender can be informed about the state of the passenger at any point in time during the journey and can respond thereto.

The disclosed motor is operative to perform the disclosed operating method. The motor is operative to drive autonomously, and comprises a self-driving unit for this purpose. In addition, the motor vehicle comprises a human-machine interface and a control unit for controlling the operation of the motor vehicle.

Thus, a motor vehicle that is designed to drive autonomously is provided with a "secure transfer mode" or a "nanny mode" for transporting a passenger.

In particular, the motor vehicle comprises a locking unit that is designed for alternate locking and unlocking of a door of the motor vehicle.

Thus, unwanted and/or unauthorized opening of the at least one door can be prevented.

In particular, the motor vehicle comprises a monitoring unit that is designed to produce monitoring information.

Thus, the passenger can be monitored. In addition, knowledge about the existence of the monitoring unit can encourage the passenger to behave peacefully.

Further, the motor vehicle can comprise a communications unit and a remote unit that is physically separate from the rest of the motor vehicle or can be so separated, wherein the communications unit is designed to communicate with the remote unit.

Thus, the sender can be informed about the state of the passenger at any point in time during the journey.

Further advantages of the present invention can be seen in the detailed description and the figures. The invention is described in detail using the figures and the following description. In the figures:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
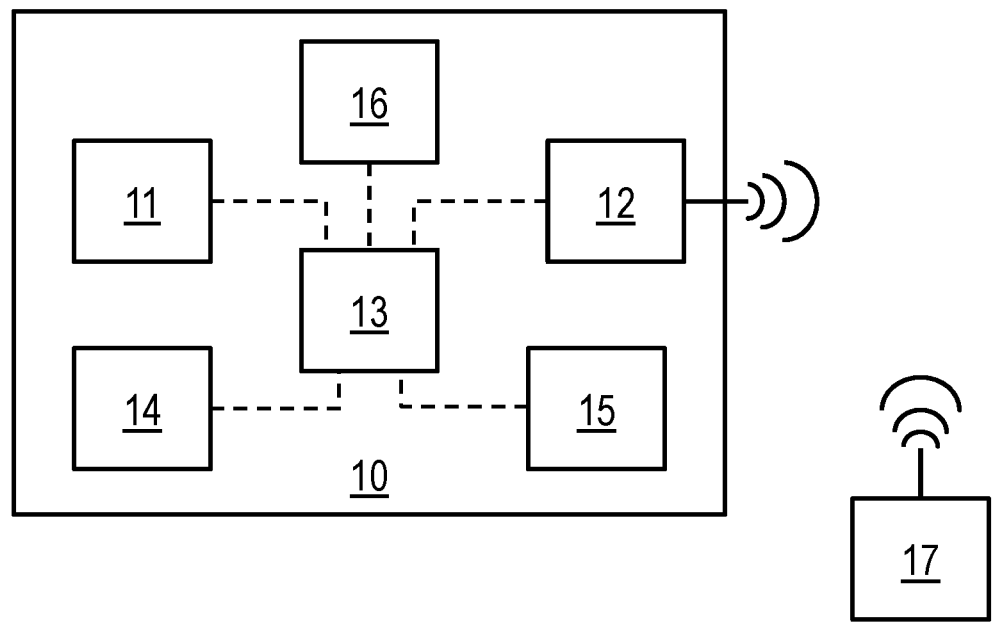
FIG. 1 is a schematic diagram of a motor vehicle according to an exemplary embodiment of the invention.

In FIG. 1, the motor vehicle 10 according to the invention is schematically represented in an exemplary design. The motor vehicle 10 comprises a self-driving unit 11 with which the motor vehicle 10 is designed to drive autonomously. In addition, the motor vehicle 10 comprises a human-machine interface 16. The motor vehicle 10 also comprises a control unit 13 that is designed to control the operation of the motor vehicle 10.

In addition, the motor vehicle 10 can comprise a locking unit 15 that is designed for alternate locking and unlocking of at least one door of the motor vehicle 10. After the locking, it is not possible for a person in the motor vehicle 10 and/or for a person outside the motor vehicle 10 to open the door. The locking unit 15 can further be designed to alternately lock and unlock an occupant restraint belt lock, wherein in the locked state opening of the occupant restraint belt lock is not possible.

Further, the motor vehicle 10 can comprise a monitoring unit 14 that is designed to produce monitoring information, in particular about a person to be transported (passenger) that is located in the motor vehicle 10. In this case, the monitoring unit 14 can for example be designed to listen to and/or to provide video surveillance of the interior of the motor vehicle 10. The monitoring unit 14 can also be designed to monitor at least one vital parameter of the passenger, for example the breathing rate. The monitoring unit 14 is in particular designed to monitor a state of the passenger.

In addition, the motor vehicle 10 can comprise a communications unit 12 and a remote unit 17 that is physically separate or separable from the rest of the motor vehicle 10. The communications unit 12 is designed to communicate with the remote unit 17, even if the remote unit 17 is disposed at a different location than the rest of the motor vehicle 10. The communications unit 12 preferably comprises a radio module for this. The communications unit 12 is designed to send information, in particular the monitoring information, to the remote unit 17. The remote unit 17 also preferably comprises a radio module and is designed to receive the information from the communications unit 12 via wireless transmission. In addition, the remote unit 17 can be designed to send information to the motor vehicle 10, so that it is possible to provide instructions to the motor vehicle 10 by means of the remote unit 17. The remote unit 17 can also be designed to contact the passenger, in particular by telephone. The remote unit 17 can in particular be a cell phone.

A motor vehicle 10 operative to carry out the method 20 is schematically depicted in FIG. 1. The control unit 13 is designed to control the operating method 20 and has a data communications connection (indicated schematically by the dashed lines in FIG. 1) for this to the self-driving unit 11 and/or the communications unit 12 and/or the monitoring unit 14 and/or the locking unit 15 and/or the human-machine interface 16 and/or at least indirectly to the remote unit 17.

Figure 2:
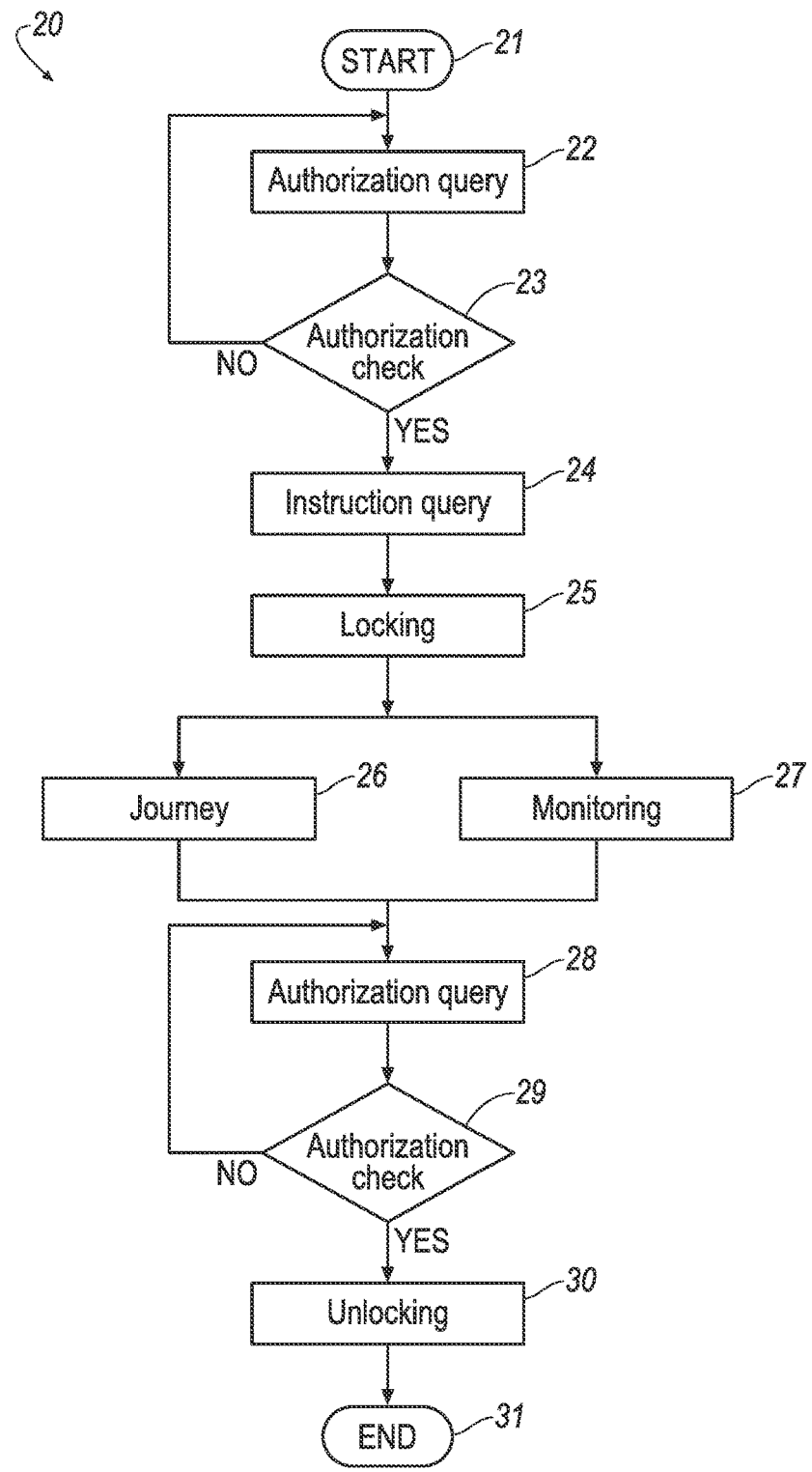
FIG. 2 is a schematic description of an operating method according to an exemplary embodiment of the invention.

The operating method 20 according to the invention is schematically represented in FIG. 2 in an exemplary embodiment from a start 21 to an end 31 with a plurality of steps of the method 22, 23, 24, 25, 26, 27, 28, 29, 30.

The operating method 20 according to the invention is used for transporting a person that is referred to in said step as the passenger and that is for example a person that requires supervision, such as for example a child. With the disclosed operating method according to the invention, the passenger can be securely transported in the motor vehicle without being accompanied in the vehicle by a supervising person. The disclosed operating method 20 may be referred to as a "nanny mode" or a "secure transfer mode" for a motor vehicle 10 that is designed to drive autonomously.

In the operating method 20, a first authorization check 23 is carried out to confirm that a sender is authorized, in particular to activate the secure transport or nanny mode. A person that is authorized may be predefined and stored in the motor vehicle 10. An authorized person can for example be a keeper or renter of the motor vehicle 10. The authorization can for example be determined by an identification of the sender themselves and/or an identity card. In addition, it is conceivable that the authorization is determined in the first authorization check 23 by entering a character sequence matching a predetermined sequence (a code).

In order to obtain information about their authorization from the sender, before the first authorization check 23 for example a first authorization query 22 can be carried out, in which a prompt requests that authorization information be entered by the sender, in particular via the human-machine interface 16. For example, in the first authorization query 22 a sender may be asked to enter a character sequence and/or provide a fingerprint scan. Any known and appropriate authorization method can be implemented by the control unit.

If the sender is authorized (block 23, or "YES"), i.e. an authorized status is assigned to the sender, the sender enters or inputs instructions in response to an instruction query 24, in particular by means of the human-machine interface 16. In this case, the instructions provided by the sender comprise at least one destination to which the motor vehicle 10 is to drive autonomously, and the indication of what criterion/criteria will be used to confirm that a person at the destination is authorized to receive (take custody of) the passenger. In this case, it is also conceivable that it is possible to define the passenger as the recipient.

Before a journey 26 by the motor vehicle 10, in which the motor vehicle 10 drives to the destination autonomously, locking 25 is carried out, wherein at least one door is locked by means of the locking unit 15, so that the door cannot be opened by the passenger. The locking 25 can also prevent opening of the door from the outside by unauthorized persons. In addition, locking 25 can include locking a belt lock of an occupant restraint belt with which the passenger is strapped, so that the belt lock cannot be opened by the passenger.

During the journey 26, the passenger is transported to the destination. Monitoring 27 of the passenger can be carried out during this. During this, at least one state of the passenger is monitored by means of the monitoring unit 14, by for example monitoring a vital parameter of the passenger and/or by video monitoring of the passenger and/or by listening to the passenger. During this, the determined state is preferably wirelessly transmitted by means of the communications unit 12 to the remote unit 17, which preferably remains with the sender. The sender is thus given the possibility of being informed about the state of the passenger.

After the end of the journey 26, the motor vehicle 10 is located at the destination. Now a second authorization check 29 is carried out, during which it is determined whether a person at the destination, known in said step as the recipient, meets the authorization criterion or criteria thereby proving he/she is authorized to receive (take custody of) the passenger. The authorization criterion/criteria that will be used to confirm the recipient is authorized has been previously defined by the instructions of the sender (at step 24) and may be stored in the motor vehicle 10. The authorization criterion can for example comprise identification of the sender themselves and/or an identity card. It is further possible that the authorization criterion is confirmed in the second authorization check 29 by requiring the recipient to enter a character sequence which matches a character sequence (an authorization code) previously established by the sender or otherwise pre-selected.

In order to obtain information confirming authorization of the recipient, for example prior to the second authorization check 29, a second authorization query 28 can be carried out, in which the recipient is requested/required to provide information which meets the authentication criterion, in particular via the human-machine interface 16. For example, in the second authorization query 28 a character sequence and/or a fingerprint and/or similar can be received, those being examples of authorization criteria.

If the recipient is authorized, i.e. the recipient has met the authorization criterion, unlocking 30 is carried out, during which the locked door of the motor vehicle 10 is unlocked and released for opening. The occupant restraint belt lock can also be released for opening during the unlocking 30.

Although the invention has been illustrated and described in detail by means of the preferred exemplary embodiments, the invention is not limited by the disclosed examples, and other versions can be derived therefrom by the person skilled in the art without departing from the protective scope of the invention.

The Figures are not necessarily accurate in detail and true to scale and can be represented enlarged or reduced to provide a better overview. Therefore, functional details disclosed here are not to be construed as limiting, but only as a clear basis that provides the person skilled in the art in this field of technology with guidance for applying the present invention in a variety of ways.

The expression "and/or" used here, if used in a sequence of two or more elements, means that each of the listed elements can be used on its own, or any combination of two or more of the listed elements can be used. If for example a combination is described that contains the components A, B and/or C, the combination can contain A alone; B alone; C alone; A and B in combination; A and C in combination; B and C in combination; or A, B, and C in combination.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for operating a self-driving motor vehicle to transport a passenger to a destination in a secure transfer mode wherein unlocking of the vehicle at the destination requires authorization, comprising:
   receiving from a sender, via a human-machine interface, instructions comprising the destination and at least one authorization criterion required to unlock the vehicle;
   operating an electronic monitoring device to monitor a passenger status during autonomous travel to the destination;
   transmitting the passenger status wirelessly for receipt by the sender; and
   at the destination, receiving from a recipient other than the passenger, the authorization criterion to unlock the vehicle,
   wherein the recipient obtains the authorization criterion from the sender.

2. The method of claim 1 further comprising:
   operating a control unit of the vehicle to confirm a sender is authorized to operate the vehicle in the secure transfer mode.

3. The method of claim 1 further comprising:
   preventing the passenger from removing an occupant restraint belt prior to arrival at the destination.

4. The method of claim 1 wherein the confirmation of the authorization criterion comprises a recipient matching an authorized finger print.

5. The method of claim 1 wherein the confirmation of the authorization criterion comprises a recipient entering into human-machine interface a character sequence that matches a predetermined character sequence.

6. The method for claim 1 wherein the monitoring of passenger status comprises video monitoring.

7. A system for self-driving motor vehicle comprising:
   a controller programmed to
      accept from a sender a destination and an authorization criterion;
      lock a vehicle door;
      monitor a passenger status during vehicle travel to the destination;
      communicate the passenger status to the sender; and
      at the destination, unlock the vehicle door after confirmation that a recipient, other than the passenger, meets the authorization criterion obtained from the sender.

8. The system of claim 7 wherein the controller is further programmed to:
   prevent a passenger from removing an occupant restraint belt prior to arrival at the destination.

9. The system of claim 7 wherein the confirmation that the recipient meets the authorization criterion comprises the recipient matching an authorized finger print.

10. The system of claim 7 wherein the confirmation that the recipient meets the authorization criterion comprises the recipient entering into a human-machine interface device a character sequence that matches a predetermined character sequence.

11. The system for claim 7 wherein the monitoring of passenger status comprises video monitoring.

12. The system for claim 7 wherein the controller is further programmed to:
   before accepting the destination and authorization criterion, confirm the sender has authorization to operate the vehicle.

13. A method for operating a self-driving motor vehicle, comprising:
   receiving from a sender instructions including a destination for the vehicle and an authorization criterion required to unlock the vehicle at the destination;
   performing a first check to confirm the sender is authorized to command operation of the vehicle;
   responsive to the instructions and the sender being authorized, locking a passenger in the vehicle and transporting the passenger to the destination;
   responsive to arrival of the vehicle at the destination and receipt of data from a recipient that was obtained by the recipient from the sender, performing a second check to confirm the recipient is authorized to escort the passenger from the vehicle, the second check including determining whether the data satisfies the authorization criterion received from the sender; and responsive to the data satisfying the authorization criterion, unlocking the vehicle.

14. The method of claim 13 further comprising:

preventing the passenger from removing an occupant restraint belt prior to arrival at the destination.

15. The method of claim 13 wherein the confirmation of the authorization criterion comprises a recipient matching an authorized finger print.

16. The method of claim 13 wherein the confirmation of the authorization criterion comprises a recipient entering into human-machine interface a character sequence that matches a predetermined character sequence.

17. The method for claim 13 wherein the monitoring of passenger status comprises video monitoring.

* * * * *